(12) United States Patent
Götz (10) Patent No.: US 11,536,558 B2
(45) Date of Patent: Dec. 27, 2022

(54) LINEAR DISPLACEMENT MEASURING APPARATUS FOR DETERMINING AN ABSOLUTE POSITION, AND LINEAR GUIDE HAVING SUCH A DISPLACEMENT MEASURING APPARATUS

(71) Applicant: Schneeberger Holding AG, Roggwil (CH)

(72) Inventor: Klaus-Dieter Götz, Sersheim (DE)

(73) Assignee: Schneeberger Holding AG, Roggwil (CH)

( * ) Notice: Subject to any disclaimer, the term of this patent is extended or adjusted under 35 U.S.C. 154(b) by 92 days.

(21) Appl. No.: 16/956,750

(22) PCT Filed: Dec. 19, 2018

(86) PCT No.: PCT/CH2018/000052
§ 371 (c)(1),
(2) Date: Jun. 22, 2020

(87) PCT Pub. No.: WO2019/119162
PCT Pub. Date: Jun. 27, 2019

(65) Prior Publication Data
US 2021/0140760 A1    May 13, 2021

(30) Foreign Application Priority Data

Dec. 22, 2017    (DE) .......................... 202017107880.9
Jan. 3, 2018    (CN) .......................... 201820011057.5

(51) Int. Cl.
*G01B 11/14*    (2006.01)
*G01D 5/347*    (2006.01)
*G01D 5/39*    (2006.01)

(52) U.S. Cl.
CPC ......... *G01B 11/14* (2013.01); *G01D 5/34753* (2013.01); *G01D 5/39* (2013.01)

(58) Field of Classification Search
CPC ........ G01B 11/14; G01B 3/004; G01B 7/003; G01B 7/02; G01B 11/002; G01D 5/34753;
(Continued)

(56) References Cited

U.S. PATENT DOCUMENTS 3,982,106 A * 9/1976 Stutz ........................ G01B 7/30
250/237 G
4,983,900 A * 1/1991 Nashiki .................... G01B 7/02
341/11
(Continued)

FOREIGN PATENT DOCUMENTS

DE    3509838 A1    10/1986
DE    297702 A5 *    1/1992    ........... G01D 5/2457
(Continued)

OTHER PUBLICATIONS

Jun. 23, 2020—International Search Report and Written Opinion (with English Trans)—PCT/CH2018/000052.
(Continued)

*Primary Examiner* — Mohamed K Amara
(74) *Attorney, Agent, or Firm* — Banner & Witcoff, Ltd.

(57) ABSTRACT

A linear displacement measuring apparatus for determining an absolute position includes a linear rail composed of individual rail segments arranged after one another in the direction of a longitudinal axis. Each of the rail segments has a material measure which comprises at least one incremental track which extends along the longitudinal axis and has equidistantly arranged position markings. In addition to the incremental track, the material measure of one of the rail segments has an absolute track with position markings for coding a plurality of absolute positions. A scanning device can be moved along the rail segments and comprises a sensor arrangement for scanning the material measures with a first sensor, a second sensor and a third sensor. The first
(Continued)

sensor and the second sensor are offset relative to one another in the direction of the longitudinal axis and are used to detect the position markings of the incremental track.

14 Claims, 2 Drawing Sheets

(58) Field of Classification Search
CPC ...... G01D 5/39; G01D 5/2458; G01D 5/2454; G01D 5/34707; G01D 11/30; G01D 5/2451; G01D 5/2457; G01D 5/34746; G01D 5/34715; G01D 5/34776; G01D 5/34792; G01D 5/2497; G01D 5/2455; F16C 41/007; F16C 29/005; F16C 29/0633

See application file for complete search history.

(56) References Cited

U.S. PATENT DOCUMENTS

| | | | |
|---|---|---|---|
| 5,434,602 A | 7/1995 | Kaburagi et al. | |
| 7,432,497 B2 | 10/2008 | Sakagami et al. | |
| 2007/0069117 A1* | 3/2007 | Sakagami | G01D 5/34776 |
| | | | 250/231.13 |

FOREIGN PATENT DOCUMENTS

| | | | | |
|---|---|---|---|---|
| DE | 202006010305 U1 | 10/2006 | | |
| DE | 102011053309 A1 | 3/2013 | | |
| EP | 0171383 A1 | 2/1986 | | |
| EP | 2533018 A1 | 12/2012 | | |
| EP | 1770374 B1 * | 11/2013 | ............. | G01D 3/024 |
| JP | H11203470 A * | 11/1999 | ............. | G24B 49/12 |
| JP | 2003057072 A * | 2/2003 | ............. | G01D 5/245 |
| JP | 2003222512 A | 8/2003 | | |
| JP | 2006098139 A | 4/2006 | | |
| JP | 6842736 B1 * | 3/2021 | ............. | G01D 5/142 |
| WO | WO-2018118399 A1 * | 6/2018 | ........... | G01D 5/2454 |

OTHER PUBLICATIONS

Apr. 18, 2019—International Search Report and Written Opinion (with English Trans)—PCT/CH2018/000052.

Nov. 22, 2018—German Search Report—App No. 202017107880.9.

* cited by examiner

LINEAR DISPLACEMENT MEASURING APPARATUS FOR DETERMINING AN ABSOLUTE POSITION, AND LINEAR GUIDE HAVING SUCH A DISPLACEMENT MEASURING APPARATUS

CROSS-REFERENCE TO RELATED APPLICATIONS

This application claims priority to PCT/CH2018/000052 entitled "Linear displacement measuring apparatus for determining an absolute position, and linear guide having such a displacement measuring apparatus" by Klaus-Dieter Götz, published as WO 2019/119162, filed on Dec. 19, 2018, which claims priority to German Utility Model DE 202017107880.9 by Klaus-Dieter Götz, filed Dec. 22, 2017, and to Chinese Utility Model CN 201820011057.5 by Klaus-Dieter Götz, filed Jan. 3, 2018. The contents of each of these applications is expressly incorporated herein by reference for all purposes.

TECHNICAL FIELD

The invention relates to a linear displacement measuring device for determining an absolute position and a linear guide in combination with a linear displacement measuring device for determining an absolute position.

PRIOR ART

Numerous known applications in various technical fields are based on linear guides which are used to guide at least one movable body during a linear movement in one direction and which for this purpose usually have a linear rail on which the movable body is guided in such a manner that it is able to perform a linear movement in the direction of the longitudinal axis of the rail. The lengths of rails that are to be manufactured in one piece and are to be suitable for linear guides are usually limited for manufacturing reasons: With known manufacturing techniques, it is usually only possible to manufacture linear rails with the required precision in one piece, the lengths of which do not exceed a certain upper limit (possibly depending on the respective manufacturing method).

In order to enable linear guidance of a movable body over an "arbitrarily" long distance, linear guides have been proposed which, for guiding the movable body, have a linear rail which is composed of a plurality of individual rail segments, each manufactured in one piece and arranged one behind the other in the direction of the longitudinal axis of the linear rail. Since the number of rail segments which can be arranged one behind the other in a predefined direction is not limited, it appears to be possible in principle to assemble a sufficiently large number of one-piece rail segments of predefined (finite) lengths to form a linear rail which can be of any length.

In many known applications of linear guides there is an interest in metrologically detecting the current position of a movable body relative to the linear rail on which the movable body is guided in order to be able to check the current position of the movable body or a change in the position of the movable body as precisely as possible based on measured values when the body moves in the longitudinal direction of the rail. Accordingly, suitable linear displacement measuring devices were proposed, which enable metrological detection of a current position of the movable body or metrological detection of a change in the position of the movable body when the body moves in the longitudinal direction of the rail.

Linear displacement measuring devices usually comprise one or more material measures, each of which has a plurality of position markings, and a scanning device movable along the material measure or material measures and having a sensor arrangement for scanning the position markings of the respective material measure or material measures. The sensor arrangement is usually configured in such a manner that it is able to detect the respective position markings and generates at least one signal which contains information about a position of the sensor arrangement relative to the position markings of a material measure and in particular varies in a characteristic manner when the scanning device together with the sensor arrangement is moved relative to the material measure or the position markings of the material measure.

In order to be able, in the case of a linear guide which has a linear rail for guiding a movable body, to allow for metrological detection of a current position of the movable body or metrological detection of a change in the position of the movable body when the body is moved in the longitudinal direction of the rail, the linear guide can be combined with a linear displacement measuring device of the aforementioned type. For example, the linear rail of the linear guide can be provided with at least one material measure, preferably a material measure which extends in the longitudinal direction of the linear rail and the position markings of which are arranged one behind the other along the longitudinal axis of the linear rail. Accordingly, the scanning device of the linear displacement measuring device can be secured to the movable body in such a manner that the scanning device is moved along with the movable body during a movement of the movable body along the linear rail and the scanning device can scan the position markings by means of the sensor arrangement.

In the case of a linear guide, the linear rail of which is composed of a plurality of individual rail segments, it is useful to provide each of the rail segments with at least one material measure of the aforementioned type. The respective material measures of the individual rail segments are preferably to be arranged in such a manner that position markings of all material measures can be scanned by means of the sensor arrangement of the scanning device when the movable body is moved along the individual rail segments.

In known linear displacement measuring devices, material measures are usually used which have either an incremental coding of different positions or a coding of different absolute positions (also called "absolute coding"). Also known are material measures which comprise an incremental coding of various positions and additionally an absolute coding of individual positions (so-called "reference positions").

A material measure with an incremental coding usually has an incremental track extending in a longitudinal direction of the material measure and having a plurality of equidistantly arranged position markings. If the position markings of such an incremental track are scanned using a sensor arrangement of a scanning device that is moved in the longitudinal direction of the incremental track, then the sensor arrangement usually generates a signal that represents a periodic variation as a function of a position coordinate which identifies the position of the sensor arrangement and changes accordingly when the scanning device moves in the longitudinal direction of the incremental track. In this case, the periodic variation of the signal as a function of the position coordinate during a movement of the scanning device in the longitudinal direction of the incremental track is caused by the fact that position markings are formed at positions which are arranged at equal distances (equidistantly) in a row one behind the other. An evaluation of the signal accordingly enables a precise detection of a relative change in the position of the scanning device during a movement of the scanning device in the longitudinal direction of the incremental track. However, this signal does not provide information about a certain absolute position with respect to the material measure.

A material measure with an absolute coding usually has an absolute track with a plurality of position markings for coding a plurality of predetermined absolute positions, which lie one behind the other in the longitudinal direction of the absolute track. The position markings of the absolute track each identify certain absolute positions with respect to the material measure and are formed in such a manner that when scanning the position markings by means of the scanning device, a signal is produced which contains information about the absolute positions which are associated with the respectively scanned position markings.

In patent publication U.S. Pat. No. 7,432,497 B2, a linear position measuring device for determining an absolute position is disclosed, which comprises a plurality of scales arranged in a row one behind the other and each having an absolute track extending over the entire length of the respective scale and including a plurality of position markings for coding several absolute positions. The individual scales are absolutely identical with regard to the structure of the absolute track, in particular with regard to the arrangement of the respective position markings for coding absolute positions on the respective absolute track. The position markings contained in the absolute track of an individual scale are therefore only suitable for coding absolute positions relating to this individual scale. In order to be able to code a plurality of absolute positions over the entire longitudinal extent of all scales, each scale has an additional scale coding which is arranged next to the respective absolute track and which uniquely identifies each scale and distinguishes it from the other scales.

Furthermore, a scanning device is provided which is movable in the longitudinal direction of the scales and comprises a sensor arrangement with three or more sensors for scanning the absolute tracks and the scale codings. A first and a second sensor of the sensor arrangement of the scanning device are intended for scanning the absolute tracks, wherein the first and the second sensor are arranged at a predetermined distance relative to one another with respect to the longitudinal direction of the scales, and the scales are arranged in such a manner that the distance between each two successive scales is smaller than the predetermined distance between the first and the second sensor. In this way it is ensured that—at least when the scanning device is placed in a transition region between two adjacent scales—the absolute tracks of two adjacent scales can be scanned by means of the first and the second sensor, and an absolute position with respect to one of the two adjacent scales can be determined by means of the first sensor and an absolute position with respect to the other one of the two adjacent scales can be determined by means of the second sensor. Furthermore, the sensor arrangement comprises at least one third sensor for scanning the respective scale coding of a scale. In order to be able to determine an absolute position with respect to the entire arrangement of all scales, the displacement measuring device comprises a computing unit which evaluates the measuring signals which are generated by the first and the second sensor when scanning the absolute tracks and by the third sensor when scanning the scale codings, respectively, and calculates the absolute position with respect to the entire arrangement of all scales from these measuring signals. This displacement measuring device has the disadvantage that all scales must be configured differently in such a manner that each scale differs from all other scales (at least by the respective scale codings). Thus, for implementing the measuring system, a large number of in each case different scales has to be provided, if necessary. If one of the scales should become unusable during operation of the measuring system and has to be replaced by another scale, another disadvantage arises from the fact that the unusable scale can only be replaced by another scale which is different from all other scales, thereby limiting the choice of the other scale.

Since the various scales of the displacement measuring device can usually only be mounted with certain tolerances with regard to their position during installation, in each case two adjacent scales (arranged directly one behind the other in the longitudinal direction of the scales) have a certain distance after installation in the longitudinal direction of the scales, which distance is not exactly known at first. Accordingly, the two absolute tracks, which are formed on two adjacent scales (arranged directly one behind the other in the longitudinal direction of the scales), also have a certain distance in the longitudinal direction of the scales, which is also not exactly known at first.

In order to be able to determine an absolute position with respect to the entire arrangement of all scales, it is therefore necessary during the first commissioning of the displacement measuring device to cause the scanning device to perform an "initialization run" along the entire arrangement of all scales in the longitudinal direction of the scales. During such an initialization run of the scanning device, the respective absolute tracks are scanned simultaneously by means of the first and the second sensor and, by comparing the measuring signals generated by the first sensor and the second sensor, the respective distances between in each case two absolute tracks formed on two adjacent scales (arranged directly one behind the other in the longitudinal direction of the scales) are calculated. These calculated distances between in each case two adjacent absolute tracks are stored in a data memory. Following this initialization run of the scanning device, the computing unit of the displacement measuring device is finally able to calculate the current absolute position of the scanning device with respect to the entire arrangement of all scales from the measuring signals generated by the first, second and third sensors and the distances between in each case two adjacent absolute tracks stored in the data memory.

If one of the scales should become unusable during operation of the displacement measuring device and would have to be replaced by another scale, a further disadvantage arises due to the fact that after the unusable scale has been replaced by another scale, an initialization run of the scanning device in the longitudinal direction of the scales (at least over a portion of the scales) must be performed again and the position markings of the respective scales must be repeatedly scanned by means of the scanning device so that after the unusable scale has been replaced, the distances between in each case two adjacent absolute tracks can be re-captured based on updated measured values and stored in the data memory.

From the patent publication EP 2 533 018 A1, a linear displacement measuring system for determining a position of a carriage in relation to a rail composed of a plurality of individual rails is known. Each of the individual rails is provided with a scale which extends in the longitudinal direction and comprises incremental position markings and/or absolute position markings. It is intended here that all scales are formed identical with regard to the position markings and that the individual rails (each provided with a scale) can be provided as identical components. In order to distinguish different single rails from each other, each single rail can be provided with an individual coding. The individual coding of a single rail is implemented here by a plurality of plugs, which are inserted into respective holes of the single rail and close these holes, wherein each plug carries discrete information, which represents the individual coding of the respective single rail. Furthermore, a scanning device with sensors for scanning the position markings of the scales and the individual codings formed on the plugs is provided. The holes into which the plugs are to be inserted are usually through holes into which fasteners can be inserted to fasten the respective single rail to a support. Accordingly, the respective plugs can only be installed after the individual rails have been mounted and must be removed again if an individual rail has to be replaced (e.g. in case of a defect). The disadvantage of this is that after commissioning of the displacement measuring system, individual plugs can be undesirably removed over time and possibly can be lost, or different plugs may be interchanged or incorrectly placed (e.g. in the wrong place, i.e. not in a hole associated with the respective individual coding formed on the respective plug) by users of the displacement measuring system. The latter results in errors during the operation of the measuring system when determining a position and consequently impairs the functionality of the measuring system.

SUMMARY OF THE INVENTION

The underlying object of present invention is to avoid the aforementioned disadvantages and to create a linear displacement measuring device for determining an absolute position with respect to a linear rail composed of a plurality of individual rail segments, which can be installed and commissioned in a simple manner and allows for simple replacement of individual rail segments. Furthermore, a linear guide in combination with such a linear displacement measuring device for determining an absolute position is to be proposed.

This object is achieved by a linear displacement measuring device for determining an absolute position with the features of claim 1 and a linear guide with the features of claim 11.

The linear displacement measuring device for determining an absolute position comprises a linear rail which has a longitudinal axis and is composed of a plurality of individual rail segments, which rail segments are arranged one behind the other in the direction of the longitudinal axis, wherein each of the rail segments has a material measure which comprises at least one first incremental track extending in the direction of the longitudinal axis and having a plurality of equidistantly arranged position markings, and wherein the material measure of one of the rail segments has an absolute track situated next to the first incremental track of this material measure and having a plurality of position markings for coding a plurality of predetermined absolute positions which lie one behind the other in the direction of the longitudinal axis.

The linear displacement measuring device further comprises a scanning device with a sensor arrangement for scanning the material measures, which sensor arrangement comprises at least a first sensor, a second sensor and a third sensor. The scanning device is guided with respect to the rail in such a manner that it is movable in the direction of the longitudinal axis along a plurality of the rail segments, wherein the first sensor is configured to detect at least one position marking of the first incremental track of one of the rail segments and to generate a first signal which contains information about a position of the scanning device relative to the at least one position marking detected by the first sensor, and wherein the second sensor is configured to detect at least one position marking of the first incremental track of one of the rail segments and to generate a second signal which contains information about a position of the scanning device relative to the at least one position marking detected by the second sensor. The first sensor and the second sensor are arranged offset relative to each other by a predetermined distance in the direction of the longitudinal axis so that the scanning device is enabled to be brought into a position with respect to in each case two adjacent rail segments, in which position the first sensor detects at least one of the position markings of the first incremental track of the material measure of the one of the two adjacent rail segments and the second sensor detects at least one of the position markings of the first incremental track of the material measure of the other one of the two adjacent rail segments. The third sensor is configured to scan the absolute track of the material measure of the one of the rail segments and to generate a third signal which contains information about a position of the scanning device relative to the predetermined absolute positions.

The linear displacement measuring device also comprises a first evaluation device for the third signal, which is configured to detect whether the scanning device is located at one of the predetermined absolute positions relative to one of the rail segments, and—if an evaluation of the third signal shows that the scanning device is located at one of the predetermined absolute positions with respect to the one of the rail segments at a first time—to determine a first absolute value which represents this one of the predetermined absolute positions.

The linear displacement measuring device also comprises a second evaluation device for the first signal and the second signal, which is configured to evaluate, after the first time, the first signal and the second signal during a first time interval between the first time and a second time and to determine a position difference between the position of the scanning device at the beginning of the first time interval and a position of the scanning device at the second time at the end of the first time interval.

Moreover, a computing unit is provided which is configured to calculate a second absolute value from the first absolute value and the position difference determined by the second evaluation device, which second absolute value represents an absolute position of the scanning device at the second time at the end of the first time interval.

The linear displacement measuring device according to the invention is characterized in that each of the rail segments of the linear rail has a material measure and the material measures of all rail segments have an incremental track with a plurality of equidistantly arranged position markings, wherein only the material measures of one of the rail segments additionally has an absolute track with a plurality of position markings for coding a plurality of predetermined absolute positions and wherein a scanning device with a sensor arrangement is provided which is movable in the longitudinal direction of the linear rail which enables scanning of the position markings of the incremental tracks of the respective rail segments and of the position markings of the absolute track of the one of the rail segments. When commissioning the displacement measuring device, it is only necessary that the scanning device is brought into a position with respect to the one rail segment which has the absolute track, in which position the third sensor of the scanning device detects (corresponding to the above-mentioned "first absolute value") one of the predetermined absolute positions which are coded on the one absolute track. The position at which the scanning device is located at the moment of detection of one of the predetermined absolute positions with respect to the one of the rail segments can thus be identified with the one of the absolute positions which has been detected by the third sensor. Each movement of the scanning device, which moves the scanning device in the longitudinal direction of the guide rail away from the one of the absolute positions previously detected by the third sensor, can then be recorded and quantitatively characterized by scanning the incremental tracks of the respective rail segments by means of the first and second sensors. An evaluation of the first signal generated by the first sensor and of the second signal generated by the second sensor comprises in particular recording a change in the first signal or a change in the second signal and in doing so enables a precise measurement of the position difference (i.e. the distance) between the position at which the scanning device is currently located and the one of the predetermined absolute positions which was previously detected by means of the third sensor, in particular since each change in the first signal or each change in the second signal corresponds to a specific change in the position of the scanning device in the direction of the longitudinal axis. The computing unit finally delivers—as a result of a calculation based on the measured position difference and on the first absolute value for one of the predetermined absolute positions, which was previously detected by means of the third sensor—a "second absolute value", which uniquely identifies the position at which the scanning device is currently located with respect to the entire arrangement of all rail segments and consequently defines an absolute position of the scanning device. After the detection of one of the predetermined absolute positions, which are coded on the one absolute track, the computing unit accordingly provides current information about an absolute position of the scanning device with respect to the entire arrangement of all rail segments. The absolute position calculated by the computing unit is updated with each movement of the scanning device in the longitudinal direction of the rail (corresponding to the respective current position). In doing so, the scanning device can be moved to any position on any rail segment. In this manner, any position which the scanning device can assume with respect to the entire arrangement of all rail segments is associated with a (unique) absolute position which can be calculated by means of the computing unit.

This calculation of the absolute position merely requires that for any arbitrary position which the scanning device can assume with respect to the entire arrangement of all rail segments, the position difference (i.e., the distance) between this arbitrary position and the one of the predetermined absolute positions, which was previously detected by the third sensor, can be measured.

The measurability of this position difference in the present case is basically ensured by the fact that the first sensor and the second sensor are arranged offset relative to one another by a predetermined distance in the direction of the longitudinal axis, so that the scanning device can be brought into a position with respect to in each case two adjacent rail segments, in which position the first sensor detects at least one of the position markings of the first incremental track of the material measure of the one of the two adjacent rail segments and the second sensor detects at least one of the position markings of the first incremental track of the material measure of the other one of the two adjacent rail segments. The latter ensures that—regardless of the position of the scanning device—at least one of the sensors of the scanning device (i.e. the first sensor, the second sensor or both the first sensor and the second sensor) is placed such with respect to the incremental tracks that at least one signal (i.e. the first signal and/or the second signal) can be generated, which is associated with a scanning of the position markings of one of the incremental tracks and consequently enables a measurement of a change in position of the scanning device in the longitudinal direction of the linear rail at any time on the basis of an evaluation of the first signal and/or the second signal.

The displacement measuring device has the advantage that all rail segments including the material measure present on the respective rail segment—with the exception of the rail segment which includes the absolute track—can be constructed completely identically and can accordingly be arranged one behind the other in any order to form the linear rail. This greatly simplifies the provision of all rail segments which are required to construct the linear rail and also facilitates the assembly of all rail segments. The latter is particularly true if a rail segment is provided with a measuring scale in such a manner that the rail segment together with the measuring scale is present as a single body which can be transported as a whole and mounted at a predetermined location. Furthermore, the commissioning of the displacement measuring device is simplified in that at the beginning of the commissioning only a single one of the absolute positions which are coded on the one absolute track on one of the rail segments has to be detected. For any other position, other than the one absolute position already detected, to which the scanning device can then be moved, an absolute position can then be calculated directly by the computing unit (based on a measurement of the position difference with respect to the absolute position already detected by means of a scanning of the incremental tracks). This calculation of the absolute position can be carried out immediately after the detection of a single one of the absolute positions coded on the one absolute track on one of the segments, namely for any position on any rail segment to which the scanning device can be moved. For this reason, any possible absolute position of the scanning device can be determined immediately after the detection of a single one of the absolute positions on the one absolute track on one of the rail segments, without the scanning device having to first perform an initialization run over the entire length of the linear rails (i.e. along all rail segments) and to scan all position markings of all material measures. In this manner, the position measuring device can advantageously be commissioned with relatively little effort, especially since an initialization run of the type mentioned above is unnecessary.

An embodiment of the displacement measuring device is configured in such a manner that the scanning device, the first evaluation device, the second evaluation device and/or the computing unit are configured to be operated by means of supplying electrical energy and that an electrical energy supply system is present, which is configured to enable an uninterrupted supply of electrical energy to the scanning device, the first evaluation device, the second evaluation device and/or the computing unit after the first time. The uninterrupted supply of electrical energy after the first time (i.e. after the time at which the scanning device is located at one of the predetermined absolute positions with respect to the one of the rail segments and has determined a first absolute value representing this one of the predetermined absolute positions) ensures that the scanning device, the first evaluation device and the second evaluation device are capable of recording a movement of the scanning device in the longitudinal direction of the linear rails after the first time and of determining the respective positional difference between the current position of the scanning device at any second time after the first time and the position of the scanning device at the first time. Accordingly, it is ensured that the computing unit provides at the second time a "second absolute value" which represents the absolute position at which the scanning device is located at the second time, namely regardless of the position to which the scanning device was possibly moved after the first time. Accordingly, it is ensured that during the uninterrupted supply of electrical energy, the computing unit constantly provides updated information about the absolute position of the scanning device with respect to the entirety of all rail segments (e.g. for a control device for controlling a machine which is to be controlled depending on the second absolute value).

Another embodiment of the displacement measuring device is configured in such a manner that the material measure of at least one of the rail segments—with the exception of the one of the rail segments which has the absolute track—comprises a second incremental track which extends next to the first incremental track of this at least one of the rail segments in the direction of the longitudinal axis and which has a plurality of equidistantly arranged position markings, and the second incremental track is arranged relative to the third sensor of the scanning device such that the second incremental track can be scanned by means of the third sensor and the position markings of the second incremental track can be detected by means of the third sensor. The second incremental track offers the possibility of generating, by means of scanning the (incremental) position markings of the second incremental track by means of the third sensor, at least one additional measuring signal which is particularly suitable for providing information which enables the displacement measuring device to be checked, for example with regard to constructional details of the rail segments and/or the functionality of the displacement measuring device. For example, the material measures of a plurality of rail segments and in particular the material measures of all rail segments—with the exception of the one of the rail segments which has the absolute track—can comprise such a second incremental track.

In a variant of this embodiment, two adjacent position markings of the second incremental track are arranged at a distance from one another which is greater than the distance between two adjacent position markings of the first incremental track. Alternatively or additionally, the third sensor can be configured to generate a fourth signal when scanning the second incremental track, and the computing unit can be configured to compare the fourth signal with the first signal and/or the second signal.

During a movement of the scanning device in the longitudinal direction of the linear rail, it is to be expected that the first sensor, the second sensor or the third sensor, respectively, will each generate signals when scanning the position markings of the first incremental track and when scanning the position markings of the second incremental track, respectively, which ideally (i.e., as is to be expected when the displacement measuring device is functioning correctly) each generate signals which vary periodically as a function of a position coordinate which identifies the position of the sensor arrangement and which changes accordingly when the scanning device moves in the longitudinal direction of the incremental track, wherein all these signals are synchronized with one another. If, contrary to expectations, the signals generated by the respective sensors show a behavior during operation of the displacement measuring device that deviates herefrom, this could indicate certain deficiencies and/or irregularities, for example errors regarding the construction and/or installation of the displacement measuring device or irregularities during operation of the displacement measuring device (malfunctions).

If two adjacent position markings of the second incremental track are arranged at a distance from each other which is greater than the distance between two adjacent position markings of the first incremental track, the first and the second sensor each generate signals (i.e. the first signal and the second signal, respectively) which vary periodically as a function of time during the movement of the scanning device in the longitudinal direction of the linear rail, which signals vary at a greater frequency than a corresponding signal (periodically varying as a function of time) (the fourth signal) which the third sensor generates when scanning the second incremental track. In this case, the signals generated by the first sensor and the second sensor, respectively, can be distinguished from the signal generated by the third sensor on the basis of the respective frequencies with which the signals vary as a function of time. The amount of the distance in which two adjacent position markings of the second incremental track are arranged one behind the other in the longitudinal direction of the linear rail can be freely selected in each case, for example such, that the respective amount of this distance varies depending on characteristic parameters of the displacement measuring device and thus serves as a coding of the characteristic parameters. Considered as "characteristic parameters of the displacement measuring device" in this respect are, for example: the "size" of the respective rail segment, characterized by the length, height and/or width of the rail segment; an identification of a specific embodiment of the displacement measuring device, provided that the displacement measuring device can be implemented in different embodiments. An evaluation of the fourth signal, which can be generated by means of the third sensor when scanning the second incremental track, provides in this case information about the respective characteristic parameters of the displacement measuring device. Such an evaluation of the fourth signal makes it possible, for example, to automatically carry out a check by technical means as to whether the displacement measuring device is in fact "correctly" installed, i.e. whether it is composed of those components (for example, rail segments) that were originally intended for a specific installation of the displacement measuring device.

The third sensor is arranged such that it is suitable, in each case depending on the respective position which the scanning device assumes with respect to the linear rail, to alternatively scan the position markings of the one absolute track on the one of the rail segments or the position markings of the second incremental track on the other ones of the rail segments. The respective second incremental track can be distinguished from the absolute track at least by the fact that the second incremental track and the absolute track have position markings which differ with respect to their spatial arrangement (the position markings of the absolute track are generally not arranged equidistantly, in contrast to the position markings of an incremental track). An evaluation of the signals generated in each case by the third sensor therefore makes it possible to automatically perform a check by technical means as to whether the scanning device is currently arranged on the one rail segment which has the absolute track or whether the scanning device is arranged on another one of the rail segments.

Another variant of the aforementioned embodiment is configured such that the absolute track of one of the rail segments comprises a first coding which contains information about at least one characteristic parameter of at least one of the other rail segments of the linear rail, and the first coding is detectable by means of the third sensor. Here, the at least one characteristic parameter can be, for example, a size of at least one of the other ones of the rail segments or a distance between two adjacent position markings of the second incremental track. The first coding is placed in the absolute track so that it can be scanned by means of the third sensor (with an appropriate arrangement of the scanning device with respect to the absolute track). Accordingly, the third sensor is configured to generate a signal when scanning the first coding, which can be evaluated, for example, by means of the first evaluation device in order to determine the at least one characteristic parameter of the aforementioned type. The same characteristic parameter which is associated with the first coding contained in the absolute track of the one of the rail segments can also be coded in the respective second incremental tracks of the other rail segments: As mentioned, the amount of the distance in which in each case two adjacent position markings of the second incremental track are arranged equidistantly one behind the other in the longitudinal direction of the linear rail can be selected such that the respective amount of this distance serves as a coding of characteristic parameters of the displacement measuring device (e.g. as a coding of the size of the respective rail segment, characterized by the length, height and/or width of the rail segment). Accordingly, the first coding on the absolute track of the one of the rail segments and the second incremental track of the respective other rail segments can be implemented in such a manner that the first coding on the absolute track of the one of the rail segments and the second incremental track in each case indicate whether the one rail segment which has the absolute track and each other rail segment which has the second incremental track are compatible with each other with respect to predetermined characteristic parameters of the displacement measuring device (e.g., with respect to the size of the respective rail segments). In this case, an evaluation of the signals generated by the third sensor enables a check that can be carried out automatically by technical means to determine whether the linear rail of the displacement measuring device is composed exclusively of rail segments which are compatible with one another with regard to predetermined characteristic parameters of the displacement measuring device.

One embodiment of the displacement measuring device is configured such that the linear rail is composed of more than two of the rail segments and all rail segments—with the exception of the one of the rail segments which has the absolute track—are configured to be identical. The term "configured to be identical" comprises here that the rail segments including the respective material measures are identical. Using a plurality of identical rail segments simplifies the provision of the rail segments required for the installation of the displacement measuring device and the installation of the displacement measuring device with regard to the assembly of the rail segments. Using a plurality of identical rail segments simplifies in particular stockkeeping of the respective rail segments which are required for the construction of one or more displacement measuring devices and simplifies the logistics during the installation of one or more displacement measuring devices.

For example, due to the use of a plurality of identical rail segments, this embodiment can be implemented advantageously in such a manner that the rail segments can be mounted in any order one behind the other to form the linear rail. In this case, no one has to pay attention to a specific order when assembling the rail segments, which simplifies the execution of the assembly, in particular with regard to a check of the rail segments to be assembled during the assembly. This has the advantage that errors during the assembly of the rail segments can be avoided more easily.

When commissioning the displacement measuring device, it is essential that with respect to the one rail segment that has the absolute track, the scanning device is brought into a position in which the third sensor of the scanning device detects (corresponding to the "first absolute value" mentioned above) one of the predetermined absolute positions that are coded on the one absolute track. Subsequently, each movement of the scanning device, which moves the scanning device in the longitudinal direction of the linear rail away from the one of the absolute positions previously detected by the third sensor, can be recorded and quantitatively characterized by scanning the incremental tracks of the respective rail segments by means of the first and second sensors so that the displacement measuring device is able to calculate a current absolute position of the scanning device. The order in which the individual rail segments are arranged one behind the other has no influence on the determination of the current absolute position of the scanning device and is therefore not relevant with regard to the determination of the respective current absolute position of the scanning device.

Furthermore, due to the use of several identical rail segments, this embodiment can be implemented advantageously in such a manner that each of the rail segments—with the exception of the one of the rail segments which has the absolute track—can be replaced by an identical rail segment. Such a replacement of one of the rail segments could be useful, for example, if one of the rail segments, which are configured identically, should prove to be defective after the commissioning the displacement measuring device, for example as a result of damage or as a result of wear. In this case, the rail segment to be replaced can be disassembled and replaced by another rail segment. The replacement of the one rail segment can be carried out during operation of the displacement measuring device. In doing so, it is useful if prior to replacing the one rail segment, the scanning device has been placed with respect to the linear rail such that the sensors of the scanning device do not scan the position markings on the material measure which are formed on the rail segment to be replaced. In this case, the computing unit provides an absolute value before replacing the one rail segment, which absolute value correctly characterizes the current absolute position of the scanning device. If, under the aforementioned circumstances, the rail segment to be replaced is now disassembled and replaced by another rail segment, this has no influence on the absolute value provided by the computing unit, especially since in this case the scanning device is not placed in such a manner that the sensors of the scanning device can detect the position markings on the material measure of the rail segment to be replaced. If the scanning device is moved again in the longitudinal direction of the linear rail after the replacement of the one rail segment, this movement of the scanning device can be recorded and quantitatively characterized with the aid of the first and the second sensor by scanning the position markings of the first incremental track of the material measures of the respective rail segments, so that the displacement measuring device is able to correctly calculate the respective current absolute position of the scanning device. After replacing the one rail segment, the operation of the displacement measuring system can be easily continued. In order to enable the current absolute position to be determined correctly, it is therefore unnecessary after replacing the one rail segment to first place the scanning device in such a manner that one of the position markings of the one absolute track can be detected by means of the third sensor of the scanning device. It is also unnecessary for the scanning device to carry out an initialization run over the entire length of the linear rail (i.e. along all rail segments) after replacing the one rail segment and to scan all position markings of all material measures. In this manner, replacing a rail segment can advantageously be carried out with relatively little effort.

Furthermore, a subject matter of the invention is a linear guide comprising a movable body and a linear displacement measuring device of the aforementioned type. The movable body is supported on the linear rail of the linear displacement measuring device via rolling elements such that the rolling elements enable a guided linear movement of the movable body in the longitudinal direction of the linear rail, wherein the scanning device of the linear displacement measuring device is arranged on the movable body. In this case, the absolute position determined by the displacement measuring device defines an absolute position of the movable body with respect to the linear rail which is composed of a plurality of rail segments arranged one behind the other in the longitudinal direction of the rail.

BRIEF DESCRIPTION OF THE DRAWINGS

Further details of the invention and in particular exemplary embodiments of the linear displacement measuring device according to the invention and the linear guide according to the invention are explained in the following based on the attached drawings. In the figures.

DESCRIPTION OF EMBODIMENTS

Figure 1:
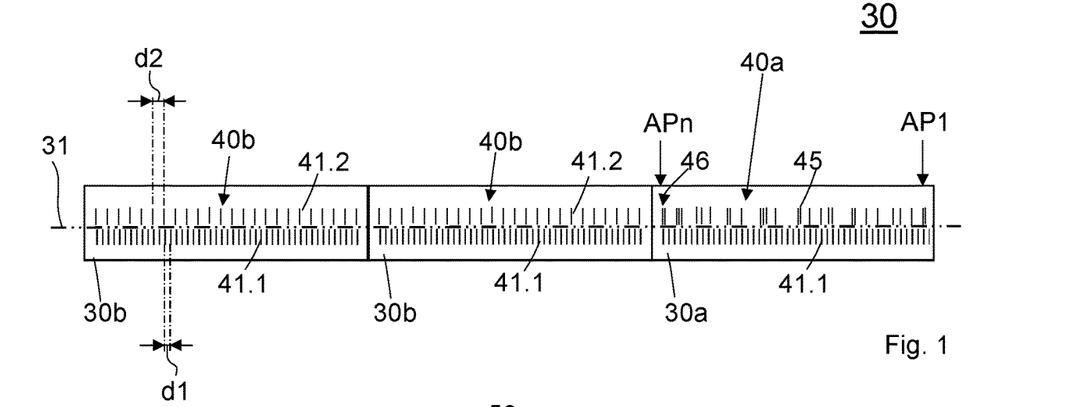
FIG. 1 shows a schematic illustration of a linear rail which is composed of a plurality of rail segments arranged one behind the other in the longitudinal direction of the linear rail, wherein the rail segments each have a material measure with position markings.
Figure 2:
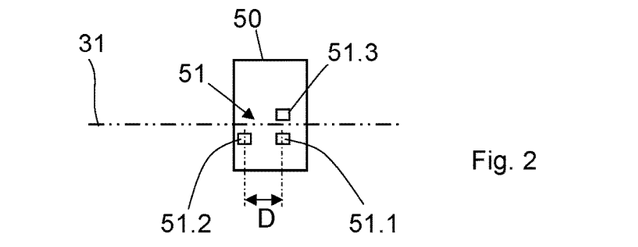
FIG. 2 shows a schematic illustration of a scanning device with a plurality of sensors for detecting the position markings of the material measures according to FIG. 1.
Figure 3:
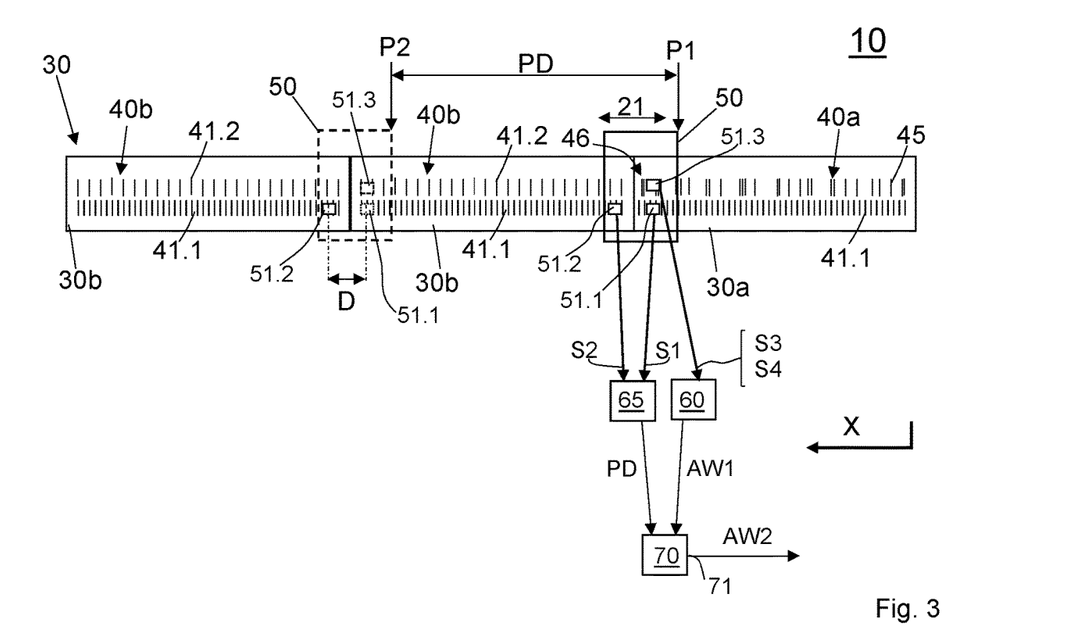
FIG. 3 shows a schematic representation of a displacement measuring device according to the invention with a linear rail according to FIG. 1 and a scanning device according to FIG. 2.

With reference to FIG. 1-3, the following first explains an embodiment of a linear displacement measuring device according to the invention. FIG. 3 shows—in a schematic representation—an overall view of a linear displacement measuring device 10 according to the invention, which comprises a linear rail 30 composed of a plurality of individual rail segments, and a scanning device 50 movable in the direction of a longitudinal axis 31 of the linear rail 30 for scanning material measures. For clarification of the present facts, FIG. 1 shows a separate schematic illustration of rail 30, and FIG. 2 shows a separate schematic illustration of the scanning device 50.

As FIGS. 1 and 3 indicate, the rail 30 is composed of two or more individual rail segments, which rail segments are arranged one behind the other in the direction of the longitudinal axis 31, wherein the entirety of all rail segments in the present example has a first rail segment 30a and two second rail segments 30b. It would also be possible within the scope of the invention that the rail 30 has only one second rail segment 30b or more than two second rail segments 30b. The rail segments 30a or 30b are preferably shaped such that—in order to form the rail 30—they can be mounted one behind the other in the direction of the longitudinal axis 31 in such a manner that in each case one end of one of the rail segments 30a or 30b abuts one end of another (adjacent) rail segment 30a or 30b (as indicated in FIGS. 1 and 3). The latter includes the fact that a gap may be present between abutting ends of two adjacent rail segments in order to facilitate assembly and/or disassembly of the rail segments or, when assembling the rail segments, to allow for adjustment of individual rail segments relative to one another within predetermined tolerances. When assembling the rail segments, they are usually fastened with suitable fasteners (e.g. screws) to a support structure (not shown in the figures) which supports the rail 30 as a whole.

Each of the rail segments 30a, 30b has a material measure. In order to be able to differentiate between different implementations of material measures, the material measure which has the first rail segment 30a is indicated below by reference sign 40a, and the material measure which has the respective second rail segment 30b is indicated below by reference sign 40b.

As indicated in FIGS. 1 and 3, each of the material measures 40a and 40b comprises at least one first incremental track 41.1 extending in the direction of the longitudinal axis 31 of the linear rail 30 and having a plurality of equidistantly arranged position markings. The individual position markings of the respective first incremental track 41.1 are formed in FIGS. 1 and 3 as straight, identically shaped linear markings aligned perpendicular to the longitudinal axis 31, which are arranged one behind the other in the direction of the longitudinal axis 31 so that they form a periodic arrangement extending in the direction of the longitudinal axis 31 and having a period length d1 (corresponding to the distance between two adjacent position markings of the incremental track).

Moreover, the material measure 40a of the first rail segment 30a comprises, in addition to the first incremental track 41.1, an absolute track 45 with a plurality of position markings for coding several predetermined absolute positions, which lie one behind the other in the direction of the longitudinal axis 31. The individual position markings of the absolute track 45 of the material measure 40a are shown in FIGS. 1 and 3 as straight, identically shaped linear markings aligned perpendicular to the longitudinal axis 31, which are arranged one behind the other in the direction of the longitudinal axis 31 in such a manner that—in contrast to the position markings of the respective incremental track 41.1—they do not form a periodic arrangement. In other words: the position markings of the absolute track 45 are arranged at irregular intervals one behind the other along the longitudinal axis 31. Here, a specific group of a plurality of position markings, which comprises a predetermined number of adjacent position markings (for example two, three, four or more position markings which are arranged in immediate succession in the direction of the longitudinal axis 31), codes a predetermined absolute position with respect to the first rail segment 30*a*, wherein the respective position markings of this group are arranged at distances from one another which uniquely identify the one predetermined absolute position with respect to the first rail segment 30*a*. In order to uniquely identify a plurality of predetermined absolute positions which lie one behind the other in the direction of the longitudinal axis 31, the absolute track 45 of the material measure 40*a* contains a plurality of different groups of several position markings, wherein each of these groups comprises a predetermined number of adjacent position markings (for example two, three, four or more position markings, which are arranged in immediate succession in the direction of the longitudinal axis 31), which each code one of the predetermined absolute positions so that different ones of these groups are associated in each case with different predetermined absolute positions, wherein the respective position markings of a particular group are arranged at predetermined distances from one another which uniquely identify that predetermined absolute position with respect to the first rail segment 30*a* that is associated with the respective group. With regard to the present example according to FIGS. 1 and 3, it is assumed that the absolute track 45 codes a number n (here, "n" denotes any natural number with n>1) of predetermined absolute positions AP1 to APn, which are preferably arranged distributed over the entire length of the rail segment 30*a*. For the sake of simplicity, only two of these predetermined absolute positions, AP1 and APn, are illustrated in FIG. 1. As can be seen, the absolute positions AP1 and APn in this example are associated with opposite ends of the absolute track 45, wherein those position markings of the absolute track 45 which form codings of the absolute positions AP1 and APn are not specifically marked in FIG. 1.

The respective material measures 40*a* and 40*b* can basically be implemented on the basis of conventional technologies which are suitable for providing position markings on the respective rail segments which can be detected by sensors. The individual position markings of the incremental track 41.1 and the absolute track 45 can be formed, for example, as structures that can be detected by optical means (e.g. optical sensors). Alternatively, the individual position markings of the incremental track 41.1 and the absolute track 45 can be formed, for example, as magnetic structures which can be detected by appropriate means sensitive to the magnetic structures (for example, sensors for measuring a magnetic field on the respective magnetic structure or sensors for measuring a magnetization in the respective magnetic structure).

As can be seen from FIGS. 2 and 3, the scanning device 50 comprises a sensor arrangement 51 for scanning the material measures 40*a* and 40*b*, respectively. The sensor arrangement 51 comprises at least one first sensor 51.1, one second sensor 51.2 and one third sensor 51.3. The scanning device 50 is guided with respect to the rail 30 in such a manner that it can be moved linearly in the direction of the longitudinal axis 31 along a plurality of the rail segments 30*a* and 30*b*, respectively, of the rail 30, preferably over the entire length of the rail 30. This movability of the scanning device 50 is indicated in FIG. 3 by a double arrow provided with the reference sign 21.

The first sensor 51.1, the second sensor 51.2 and the third sensor 51.3 are arranged at intervals to each other in order to achieve that these sensors can simultaneously scan different, spatially separated areas of the material measures 40*a* and 40*b*, respectively. For this purpose, the sensors 51.1, 51.2 and 51.3 can be arranged, for example, at three separate points which form the three corners of a triangle (FIGS. 2 and 3).

The sensors 51.1 and 51.2 are used for scanning the first incremental track 41.1 of the material measures 40*a* and 40*b* on the rail segments 30*a* and 30*b*. The first sensor 51.1 is in particular configured to detect at least one position marking of the first incremental track 41.1 of one of the rail segments 30*a* or 30*b* (provided the first sensor 51.1 is suitably positioned with respect to the position marking to be detected) and to generate a first signal S1 which contains information about a position of the scanning device 50 relative to the at least one position marking detected by the first sensor 51.1. Furthermore, the second sensor 51.2 is also configured to detect at least one position marking of the first incremental track 41.1 of one of the rail segments 30*a* and 30*b*, respectively (provided that the second sensor 51.2 is suitably positioned with respect to the position marking to be detected), and to generate a second signal S2 which contains information about a position of the scanning device 50 relative to the at least one position marking detected by the second sensor 51.2.

As can be seen from FIGS. 2 and 3, the first sensor 51.1 and the second sensor 51.2 are arranged offset relative to one another in the direction of the longitudinal axis 31 by a predetermined distance D, so that with respect to in each case two adjacent rail segments, i.e. with respect to the first rail segment 30*a* and the second rail segment 30*b* adjacent to the rail segment 30*a*, or with respect to two adjacent rail segments 30*b*, the scanning device 50 can be brought into a position in which the first sensor 51.1 detects at least one of the position markings of the first incremental track 41.1 of the material measure of the one of the two adjacent rail segments and the second sensor 51.2 detects at least one of the position markings of the first incremental track 41.1 of the material measure of the other one of the two adjacent rail segments.

Furthermore, the third sensor 51.3 is configured to scan the absolute track 45 of the material measure 40*a* of the one first rail segment 30*a* and to generate a third signal S3 which contains information about a position of the scanning device 50 relative to the predetermined absolute positions.

For a more detailed explanation of the aforementioned facts, FIG. 3 shows the scanning device 50 in two different positions, in which the scanning device 50 can be brought when it is moved—linearly guided with respect to the rail 30—in the direction of the longitudinal axis 31. In FIG. 3, for example, the scanning device 50—represented by a rectangle illustrated by means of a solid line—is shown for the case that the scanning device 50 has been brought to a position P1 (marked by an arrow in FIG. 3) so that the scanning device 50 is located in an area of the linear rail 30 in which one end of the first rail segment 30*a* adjoins one end of the adjacent second rail segment 30*b*. In this case, the sensors 51.1, 51.2 and 51.3 of the sensor arrangement 51 are arranged with respect to the material measure 40*a* of the first rail segment 30*a* and the material measure 40*b* of the adjacent second rail segment 30*h* in such a manner that:

the first sensor 51.1 is located at the first incremental track 41.1 of the material measure 40*a* of the first rail segment 30*a* so that the first sensor 51.1 is suitably positioned to detect at least one position marking of the first incremental track 41.1 of the material measure 40*a*;

the second sensor 51.2 is located at the first incremental track 41.1 of the material measure 40*b* of the adjacent second rail segment 30*b*, so that the second sensor 51.2 is suitably positioned to detect at least one position marking of the first incremental track 41.1 of the material measure 40*b* of the adjacent second rail segment 30*b*;

the third sensor 51.3 is located at the absolute track 45 of the first rail segment 30*a* so that the third sensor 51.3 is suitably positioned to detect at least one position marking of the absolute track 45.

FIG. 3 further illustrates the scanning device 50—represented by a rectangle illustrated by a dashed line—in the case where the scanning device 50 has been brought to a position P2 (marked by an arrow in FIG. 3) so that the scanning device 50 is located in an area of the linear rail 30 in which an end of a second rail segment 30*b* is adjacent to an end of another (adjacent) second rail segment 30*b*. In this case, the sensors 51.1, 51.2 and 51.3 of the sensor arrangement 51 are arranged with respect to the material measure 40*b* of the one second rail segment 30*b* and the material measure 40*b* of the other second rail segment 30*b* in such a way that:

the first sensor 51.1 is located at the first incremental track 41.1 of the one second rail segment 30*b*, so that the first sensor 51.1 is suitably positioned to detect at least one position marking of the first incremental track 41.1 of the one second rail segment 30*b*;

the second sensor 51.2 is located at the first incremental track 41.1 of the other (adjacent) second rail segment 30*b*, so that the second sensor 51.2 is suitably positioned to detect at least one position marking of the first incremental track 41.1 of the other second rail segment 30*b*;

the third sensor 51.3 is located at such a distance away from the absolute track 45 of the first rail segment 30*a* that the third sensor 51.3 is not suitably positioned to detect a position marking of the absolute track 45.

Deviating from the aforementioned positions P1 and P2, the scanning device 50 can be moved to other positions at which both the first sensor 51.1 and the second sensor 51.2 are each arranged at the same first incremental track 41.1 of the same material measure 40*a* and 40*b*, respectively, of one of the rail segments 40*a* or 40*b*, so that the sensors 51.1 and 51.2 are suitably placed to exclusively detect position markings of the same first incremental track 41.1. Since the sensors 51.1 and 51.2 are arranged offset relative to each other by the distance D in the direction of the longitudinal axis 31, the sensors 51.1 and 51.2 each detect in this case different position markings arranged at different locations, i.e., usually different position markings which have a distance relative to each other in the direction of the longitudinal axis 31 which corresponds approximately to the distance D.

With regard to the generation of the aforementioned signals S1, S2 and S3, it is assumed in this connection that each of the sensors 51.1, 51.2 and 51.3 comprises at least one sensor element (or optionally several sensor elements), wherein each sensor element is sensitive with regard to a position marking to be detected (at least when the sensor element is placed in the vicinity of the position mark) and is configured to generate a signal which depends on the arrangement of the sensor element relative to the position marking to be detected in such a manner that a signal which can be generated by the sensor element varies depending on a distance of the sensor element relative to the position marking to be detected. If the scanning device 50 is moved in the direction of the longitudinal axis 31, the signals S1, S2 and S3 generated by the sensors 51.1, 51.2 and 51.3 vary accordingly depending on a position coordinate X which identifies the respective position of the scanning device 50 relative to the linear rail 30 in the direction of the longitudinal axis 31.

The signals S1 and S2 generated by the sensors 51.1 and 51.2, respectively, usually show a periodic variation as a function of the position coordinate X of the scanning device 50, especially since the position markings of the first incremental track 41.1 are arranged periodically (equidistantly) with respect to the longitudinal axis 31. Here, the signals S1 and S2 generally show substantially the same periodic signal characteristic as a function of the position coordinate X of the scanning device 50 (at least under the condition that all position markings are formed in the same way and the sensors 51.1 and 51.2 have the same properties with respect to the detection of a position marking). The signals S1 and S2 are not necessarily identical with respect to a predetermined time, especially since the sensors 51.1 and 51.2 are arranged relative to one another at a distance D with respect to the longitudinal axis 31 and consequently the signal progression of the signal S1 as a function of the position coordinate X must have a phase difference compared to the signal progression of the signal S2 as a function of the position coordinate X. The latter applies even if the sensors 51.1 and 51.2 are both arranged at the same first incremental track 41.1 of the same material measure 40*a* or 40*b*. Thus, the greater the distance D in relation to the period length d1 of the first incremental track 41.1 is, the greater the aforementioned phase difference between the signals S1 and S2 will be.

Furthermore, it is to be taken into account that although all position markings which belong to the same first incremental track 41.1 of the same material measure 40*a* or 40*b* of the same rail segment 30*a* or 30*b* are arranged periodically with the period length d1, the periodicity of the arrangement of the position markings may be "disturbed" in an area of the rail 30 in which one of the rail segments 30*a* or 30*b* adjoins an adjacent rail segment 30*a* or 30*b*.

Due to the fact that the linear rail 30 is composed of a plurality of individual rail segments 30*a* or 30*b* and accordingly a plurality of material measures 40*a* or 40*b*, each with a first incremental track 41.1, are arranged one behind the other in the direction of the longitudinal axis 31, there are usually two adjacent first incremental tracks 41.1 (i.e. the first incremental track 41.1 formed on one of the adjacent rail segments and the first incremental track 41.1 formed on the other one of the adjacent rail segments) are arranged relative to one another in such a manner that an end of one of the two adjacent first incremental tracks 41.1 adjoins an end of the other one of the two adjacent first incremental tracks 41.1. When assembling the individual rail segments, there is usually a certain amount of play (within certain tolerances) with regard to the respective positions at which the individual rail segments are fixed. As a result—depending on the arrangement of two adjacent rail segments relative to one another—one end of one of two adjacent first incremental tracks 41.1 may adjoin one end of the other one of the two adjacent first incremental tracks 41.1 in such a manner that the position marking which forms the end of the one of the two adjacent first incremental tracks 41.1 is at a distance in the direction of the longitudinal axis 31 relative to the position marking forming the end of the other one of the two adjacent first incremental tracks 41.1, which distance is more or less different from the period length d1 of the first incremental track 41.1.

If under these circumstances the sensor 51.1 is moved in the longitudinal direction of rail 30 from one of the two adjacent rail segments to the other one of the two adjacent rail segments, the sensor 51.1, when scanning the respective first incremental track 41.1, generates a signal S1 which, as a function of the position coordinate X, has a periodic variation (or a periodic signal progression) with the period length d1, at least for the areas of the position coordinate X, which correspond either to an arrangement of the sensor 51.1 in the area of the one of the two adjacent first incremental tracks 41.1 or to an arrangement of the sensor 51.1 in the area of the other one of the two adjacent first incremental tracks 41.1. At the transition from the one end of the first incremental track 41.1 of the one of the two adjacent rail segments to the one end of the first incremental track 41.1 of the other one of the two adjacent rail segments, however, the signal S1 as a function of the position coordinate X may exhibit an abrupt signal change which corresponds to a phase jump at the transition from the one first incremental track 41.1 to the adjacent first incremental track 41.1. This phase jump in the signal progression of the signal S1 is in each case all the greater, the more the distance between the position marking which forms the end of the one of the two adjacent first incremental tracks 41.1 and the position marking which forms the end of end of the other one of the two adjacent first incremental tracks 41.1 differs in the direction of the longitudinal axis 31 from the period length d1 of the first incremental track 41.1.

The signal S2 generated by the second sensor 51.2 shows a corresponding dependence on the position coordinate X analogous to the dependence of the signal S1 on the position coordinate X.

If under these circumstances the sensor 51.2 is moved in the longitudinal direction of rail 30 from one of the two adjacent rail segments to the other one of the two adjacent rail segments, the sensor 51.2, when scanning the respective first incremental track 41.1, generates a signal S1 which, as a function of the position coordinate X, has a periodic variation (or a periodic signal progression) with the period length d1, namely at least for the areas of the position coordinate X, which correspond either to an arrangement of the sensor 51.2 in the area of the one of the two adjacent first incremental tracks 41.1 or to an arrangement of the sensor 51.2 in the area of the other one of the two adjacent first incremental tracks 41.1. At the transition from the one end of the first incremental track 41.1 of the one of the two adjacent rail segments to the one end of the first incremental track 41.1 of the other one of the two adjacent rail segments, however, the signal S2 as a function of the position coordinate X may exhibit an abrupt signal change which corresponds to a phase jump in the progression of the signal S2 as a function of the position coordinate at the transition from the one first incremental track 41.1 to the adjacent first incremental track 41.1. This phase jump in the signal progression of the signal S2 as a function of the position coordinate X is in each case all the greater, the more the distance between the position marking which forms the end of of the one of the two adjacent first incremental tracks 41.1 and the position marking which forms the end of the other one of the two adjacent first incremental tracks 41.1 differs in the direction of the longitudinal axis 31 from the period length d1 of the first incremental track 41.1.

As explained above in connection with FIG. 3, the sensors 51.1 and 51.2 of the sensor arrangement 51 of the scanning device 50 are each arranged relative to the rail segments of the linear rail 30 in such a manner that—depending on the position of the scanning device 50 relative to the respective rail segments—either one of the sensors 51.1 or 51.2 or both sensors 51.1 and 51.2 is or are suitably placed in order to detect in each case a position marking of a first incremental track 41.1 at least at one of the rail segments and, accordingly, to generate the signal S1 and/or the signal S2. Should the sensor 51.1 (or alternatively the sensor 51.2) at the transition from one end of the first incremental track 41.1 of one of two adjacent rail segments to the one end of the first incremental track 41.1 of the other one of the two adjacent rail segments be temporarily positioned in such a manner that it cannot detect a position marking of one of the first incremental tracks 41.1 and, accordingly, cannot generate a signal S1 (or alternatively, no signal S2), it is ensured at all times that the other sensor 51.2 (or alternatively the sensor 51.1) is specifically placed such that it can detect a position marking of one of the first incremental tracks 41.1 and, accordingly, can generate a signal S2 (or alternatively a signal S1).

Furthermore, since both the signal S1 and the signal S2 as a function of the local coordinate X, at least for certain areas of the local coordinate X, each exhibit a periodic signal progression with the period length d1 of the first incremental track 41.1, a measurement of the two signals S1 and S2 during a movement in the direction of the longitudinal axis 31 makes it possible to evaluate the respective changes in the measured signals S1 and S2 and to determine therefrom a relative change in the position of the scanning device 50 in the direction of the longitudinal axis 31 during the movement (corresponding to the length of the distance covered by the scanning device 50) or the position difference PD between the position of the scanning device 50 at the start of the movement and the position of the scanning device 50 at any later time after the start of the movement.

It should be noted that an evaluation of signals S1 and S2 can be carried out in a particularly simple manner if the displacement measuring device 10 is configured such that neither the progression of signal S1 nor the progression of signal S2 as a function of the position coordinate X of the scanning device 50 at a transition of the sensor 51.1 or the sensor 51.2 from the one end of the first incremental track 41.1 of the one of two adjacent rail segments to one end of the first incremental track 41.1 of the other one of the two adjacent rail segments does not exhibit a phase jump which would be associated with an abrupt change in the signal S1 or the signal S2. In order to avoid such a phase jump it is possible, for example, to ensure during assembly of the individual rail segments that the distance in the direction of the longitudinal axis 31 between the position marking which forms the end of the one of the two adjacent first incremental tracks 41.1 and the position marking which forms the end of the other one of the two adjacent rail segments is either equal to the period length d1 of the first incremental track 41.1 or equal to a multiple of the period length d1.

In addition, evaluating the signals S1 and S2 can be further simplified if the distance D of the sensors 51.1 and 51.2 in the direction of the longitudinal axis 31 is selected such that the distance D is equal to the period length d1 of the first incremental track 41.1 or equal to a multiple of the period length d1. In this case, the signals S1 and S2 as a function of the position coordinate X of the scanning device 50 have a phase difference relative to one another which is so large that the signals S1 and 32 have the same progression as a function of the position coordinate X of the scanning device 50. In this case, if both signals S1 and S2 are available simultaneously, one of the two signals S1 and S2, respectively, is redundant.

As FIG. 3 further indicates, the displacement measuring device 10 for evaluating the signals which can be generated by the sensors 51.1, 51.2 and 51.3 comprises a first evaluation device 60 for a third signal S3 which can be generated by the third sensor 51.3 and a second evaluation device 65 for a first signal S1 which can be generated by the first sensor 51.1 and a second signal S2 which can be generated by the second sensor 51.2. Accordingly, the first evaluation device 60 is connected to the third sensor 51.3 in order to be able to receive a signal S3 generated by the third sensor 51.3. Furthermore, the second evaluation device 65 is connected to the first sensor 51.1 and the second sensor 51.2 in order to be able to receive a signal S1 generated by the first sensor 51.1 and a signal S2 generated by the second sensor 51.2.

During a first commissioning of the displacement measuring device 10, the scanning device 50 must first be or will be positioned with respect to the first rail segment 30a (if necessary by means of a movement of the scanning device 50 in the direction of the longitudinal axis 31) in such a manner that the third sensor 51.3 is enabled to scan at least a portion of the absolute track 45 of the material measure 40a of the first rail segment 30a, which includes at least those position markings which code one of the predetermined absolute positions AP1 to APn, so that the third sensor 51.3 can detect those position markings which code the one of the predetermined absolute positions. For this purpose, the scanning device 50 can be moved, for example, along a portion of the absolute track 45 in the direction of the longitudinal axis 31, wherein the first evaluation device 60 simultaneously evaluates the signal S3 generated by the third sensor 51.3 and the second evaluation device 65 evaluates the signal S1 generated by the first sensor 51.1 and the signal S2 generated by the second sensor S2. The second evaluation device 65 is configured to record the relative change in the position coordinate X of the scanning device 50 during the movement, while the first evaluation device 60 is configured to record and evaluate a change in the signal S3 during the relative change in the position coordinate X of the scanning device 50. Here, the change in the signal S3 recorded in each case during the relative change in the position coordinate X is characteristic of the spatial arrangement of those position markings of the absolute track 45 which were detected by the third sensor 51.3 during the movement of the scanning device 50. Accordingly, the recorded change in the signal S3 provides information as to whether the detected position markings of the absolute track 45 code one of the predetermined absolute positions or which of the predetermined absolute positions are possibly coded by the position markings detected by the third sensor 51.3.

Accordingly, the first evaluation unit 60 is configured to detect during a first commissioning of the displacement measuring device 10, by means of an evaluation of the third signal S3, whether the scanning device 50 is located at one of the predetermined absolute values positions AP1 to APn with respect to the first rail segment 30a, and—if an evaluation of the third signal S3 shows that the scanning device 50 is located at one of the predetermined absolute positions with respect to the one of the rail segments 30a at a first time t1—to determine a first absolute value AW1 which represents this one of the predetermined absolute positions. The absolute value AW1 can, for example, correspond to a position coordinate of the scanning device 50 which is associated with the position of the scanning device 50 at the first time t1.

With regard to the example shown in FIG. 3, it is assumed in the following that the scanning device 50 is located at the position P1 specified in FIG. 3 at the first time t1 and the position P1 is one of the specified absolute positions AP1 to APn, so that the first absolute value AW1 determined by the first evaluation device 60 would be associated with the position P1 according to FIG. 3. Following the time t1, the scanning device 50 can be brought into any position in the area of the linear rail 30 which the scanning device can reach during a movement in the direction of the longitudinal axis 41. In the example according to FIG. 3, it is assumed, for example, that the scanning device 50 has been moved to the specified position P2 up to a time t2.

The displacement measuring device 10 is configured such that, after the first time t1, the second evaluation device 65 evaluates the first signal S1 and the second signal S2 during a first time interval between the first time t1 and the second time t2 and determines from the respective changes in the signals S1 and S2 during this first time interval a position difference PD between the position P1 of the scanning device 50 at the beginning of the first time interval and the position P2 of the scanning device 50 at the second time t2 at the end of the first time interval. The position difference PD corresponds to the difference between the position coordinate of the scanning device 50, which is associated with position P2, and the position coordinate of the scanning device 50, which is associated with position P1.

As further indicated in FIG. 3, the displacement measuring device 10 comprises a computing unit 70. This is configured to calculate a second absolute value AW2 from the first absolute value AW1 and the position difference PD determined by the second evaluation device 65, which second absolute value represents an absolute position of the scanning device 50 at the second time t2 at the end of the first time interval. The second absolute value AW2 is associated with the position P2 and defines it uniquely.

If the scanning device 50 is moved to another position different from P2 after the time t2, the second evaluation device 65 further evaluates the signals S1 and S2 or changes in the signals S1 and S2 to determine the "current" position difference PD which distinguishes this other position from position P1 at time t1. Accordingly, the evaluation unit 70 is configured to calculate a "current" second absolute value AW2 which uniquely identifies this other position. In this manner it is ensured that at any time after time t1, the computing unit 70 provides a second absolute value AW2 which corresponds to the position at which the scanning device 50 is located at the respective time. At time t1, the second absolute value AW2 is obviously identical to the first absolute value AW1, since at this time, the position difference PD is equal to 0.

As FIG. 3 indicates, the computing unit 70 has an output interface 71 via which the second absolute value AW2 can be output, for example, to a display device (not shown) for displaying the respective absolute position of the scanning device 50 and/or to a control device (not shown) for controlling a machine depending on the respective absolute position of the scanning device 50.

As further indicated in FIGS. 1 and 3, the material measure 40b of a second rail segment 30b or of a plurality of rail segments 30b or of each of the rail segments 30b can (optionally) have a second incremental track 41.2 which extends next to the first incremental track 41.1 of the respective measuring standard 40b in the direction of the longitudinal axis 31 and has a plurality of equidistantly arranged position markings. The position markings of the respective second incremental track 41.2 are arranged one behind the other in the direction of the longitudinal axis 31 in such a manner that they form a periodic arrangement with a period length d2 (corresponding to the distance between two adjacent position markings of the incremental track 41.2) extending in the direction of the longitudinal axis 31.

The respective second incremental track 41.2 is arranged relative to the third sensor 51.3 of the scanning device 50 in such a manner that it can be scanned by means of the third sensor 51.3 and the position markings of the second incremental track 41.2 can be detected by means of the third sensor 51.3 (provided that the scanning device 50 is positioned accordingly with respect to the respective second incremental track 41.2).

The individual position markings of the second incremental track 41.2 can be implemented in the same way as the position markings of the first incremental track 41.1, wherein the period length d2 of the second incremental track 41.2 can differ from the period length d1 of the first incremental track 41.1.

In the present example, the third sensor 51.3 generates during the scanning of the respective second incremental track 41.2 a fourth signal S4 which, during a movement of the scanning device 50 in the direction of the longitudinal axis 31 along the respective second incremental track 41.2, has a periodic variation (or a periodic signal progression) with the period length d2 as a function of the position coordinate X of the scanning device 50.

The first evaluation device 60 is connected to the third sensor 51.3 in order to be able to receive and evaluate a signal S4 generated by the third sensor. The first evaluation device 60 is in particular configured to record changes in the fourth signal S4 during a movement of the scanning device 50 in the direction of the longitudinal axis 31 and to correlate them with a change in position of the scanning device 50. Furthermore, the computing unit 70 is configured to compare the fourth signal S4 with the first signal S1 and/or the second signal S2. The computing unit 70 is in particular configured to compare a change in the fourth signal S4 generated in the event of a change in position of the scanning device 50 with corresponding changes in the first signal S1 and/or the second signal S2. Such a comparison of the signal S4 with the signal S1 and/or the signal S2 makes it possible to check whether the changes in signals S1, S2 and S4 correspond, within given tolerances, to a specific change in position of the scanning device 50 and therefore provides an indication as to whether the scanning device 50 is functioning as expected.

In order to enable a measurement as accurate as possible of a change in position of the scanning device 50 in the direction of the longitudinal axis 31, it is advantageous to specify a value as small as possible for the period length d1 of the first incremental track 41.1. For the period length d2 of the second incremental track 41.2, d2>d1 may hold true, especially since under these circumstances it is possible to check the functioning of scanning device 50 with sufficient accuracy.

Accordingly, the period length d2 of the second incremental track 41.2 can be freely specified, independently of d1. In order to ensure a simple check of the functionality of the scanning device 50, d2 can be equal to a multiple of d1, for example. For the second incremental track 41.2 shown in FIGS. 1 and 3, d2=2×d1 holds true, for example.

For example, the period length d2 can be selected such that d2 is correlated with one or more characteristic parameters of the displacement measuring device 10, for example with a "size" of the respective rail segment 30b (characterized by the length, height and/or width of the rail segment 30b) or an identification of a specific embodiment of the displacement measuring device 10 (provided that the displacement measuring device 10 can be provided in different embodiments).

The absolute track 45 of the rail segment 30a in the example according to FIG. 1 or 3 comprises a first coding 46, which contains information about the characteristic parameter(s) of the displacement measuring device 10 mentioned above. The first coding 46 is implemented here as a specific arrangement of several position markings of the absolute track 45 (in the present example placed at one end of the absolute track 45) and is therefore scannable by means of the third sensor 51.3 and therefore detectable and evaluable by means of the first evaluation device 60.

After a first scanning of the first coding 46, the first evaluation device 60 can thus determine the respective characteristic parameters of the displacement measuring device 10. As soon as the scanning device 50 is subsequently enabled during a movement in the direction of the longitudinal axis 31 to scan the second incremental track 41.2 of one of the second rail segments 30b, the first evaluation device 60 can evaluate the fourth signal S4 generated by the third sensor and determine the period length d2 of the second incremental track 41.2 from a change in the signal as a function of the position coordinate X of the scanning device 50. In this way the first evaluation device 60 is able to check as to whether the determined period length d2 of the second incremental track 41.2 of the respective second rail segment 30b is compatible or not with the first coding 46 contained in the absolute track 45.

Figure 4:
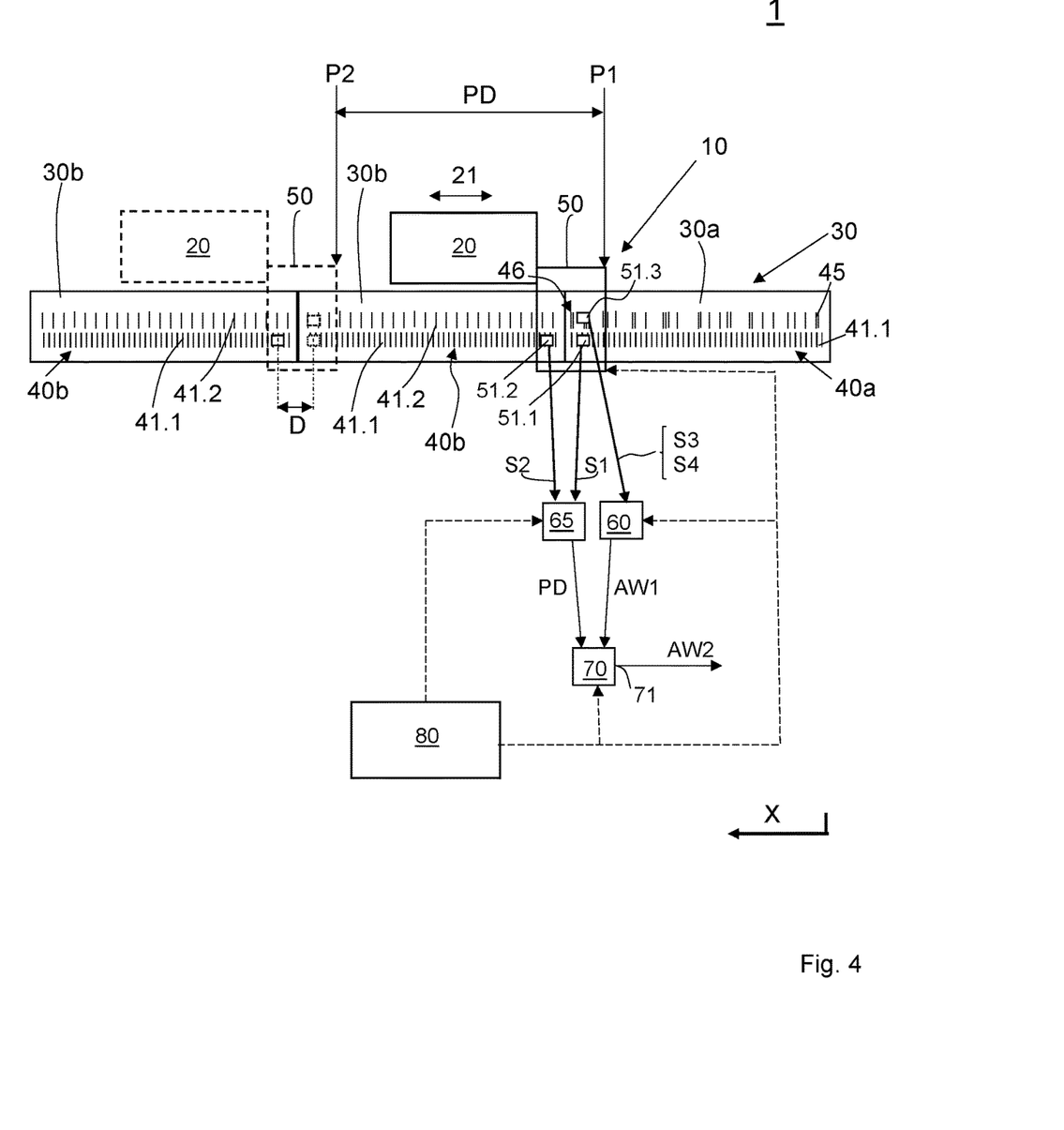
FIG. 4 shows a schematic illustration of a linear guide according to the invention for guiding a movable body with a displacement measuring device according to FIG. 3.

With reference to FIG. 4, the following explains an embodiment of a linear guide according to the invention for a moving body. FIG. 4 shows—in a schematic Illustration—a linear guide 1 which comprises a movable body 20 and a linear displacement measuring device 10 according to FIG. 3. In FIGS. 3 and 4, corresponding parts that are identical or act in the same manner are each marked with identical reference signs. In particular, the linear guide 1 has the same linear rail 30 as the displacement measuring device 10 according to FIG. 3.

The movable body 20 of the linear guide 1 is supported on the linear rail 30 via rolling elements (not shown) so that the rolling elements enable a guided linear movement of the movable body 20 in the longitudinal direction of the linear rail 30 (i.e. in the direction of the longitudinal axis 31 shown in FIG. 1). A scanning device 50 of the linear displacement measuring device 10 according to FIG. 3 is arranged on the movable body 20 so that the scanning device 50 is moved along with a movement of the movable body 20 in the direction of the longitudinal axis 31 of the linear rail 30 and can scan the position markings of the individual material measures 40a and 40b. With respect to the construction and function of the scanning device 50, the first evaluation device 60, the second evaluation device 65 and the computing unit 70, the linear guide 1 is in each case identical to the displacement measuring device 10 according to FIG. 3. During a first commissioning of the linear guide 1, the movable body 20 must therefore first be positioned with respect to the first rail segment 30a in such a manner that the third sensor 51.3 can at least detect position markings of the absolute track 45 which code one of the predetermined absolute positions AP1 to APn, and that the evaluation device can determine the first absolute value AW1 which corresponds to the predetermined absolute position coded by means of the detected position markings. Any change in position of the movable body 20 in the direction of the longitudinal axis 31 is determined by the second evaluation device 65 by means of an evaluation of the signals S1 and S2 generated by the sensors 51.1 and 51.2. Accordingly, the computing unit 70 provides a second absolute value AW2 which corresponds to the position at which the scanning device 50 or the movable body 20 is located in each case. In FIG. 4, the movable body 20 and the scanning device 50 are each shown in two different positions: for the case that the scanning device 50 is located at position P1, and for the case that the scanning device 50 is located at position P2 (analogous to FIG. 3).

The linear guide 1 according to FIG. 4 as a whole can be part of a machine which, for example, has an electric drive motor (not shown in FIG. 3) for moving the movable body 20, a machine control (not shown in FIG. 4) for controlling the electric drive motor and optionally other controllable components of the machine, and an energy supply device for supplying the electric drive motor, the other controllable components of the machine and/or the machine control with energy, wherein the machine control is configured to receive the second absolute value AW2 provided by the computing unit 70 during operation of the machine and to control the machine depending on the second absolute value AW2.

The scanning device 50, the first evaluation device 60, the second evaluation device 65 and/or the computing unit 70 comprise electronic components and require a supply of electrical energy for their operation. As FIG. 4 indicates, a separate electrical energy supply device 80 may be provided which is configured to enable, after a first commissioning of the linear displacement measuring device 10 or the linear guide 1, an uninterrupted supply of electrical energy to the scanning device 50, the first evaluation device 60, the second evaluation device 65 and/or the computing unit 10, namely independently of a supply of energy to the electric drive motor, the other controllable components of the machine and/or the machine control.

The separate electrical energy supply device 80 ensures that the scanning device 50, the first evaluation device 60, the second evaluation device 65 and/or the computing unit 10 are functional and accordingly provide a second absolute value AW2 corresponding to the absolute position of the scanning device 50, even if the operation of the machine itself is interrupted, for example due to an interruption in the energy supply to the electric drive motor, the other controllable components of the machine and/or the machine control. Once the operation of the machine is resumed after restoration of the supply of energy to the electric drive motor, the other controllable components of the machine and/or the machine control, the computing unit 70 is capable of providing the machine control with a second absolute value AW2 which corresponds to the current absolute position of the scanning device 50 at the time of continuation of operation of the machine. The latter is also applicable in the event that the scanning device 50 was moved in the direction of the longitudinal axis 31 during the interruption of the energy supply to the electric drive motor, the other controllable components of the machine and/or the machine control.

All second rail segments 30b (including the material measure 40b present on the respective second rail segment 30b) of the rail 30 of the displacement measuring device 10 or the linear guide 1 may be of identical construction in order to enable that a plurality of rail segments 30b required for the construction of the rail 30 are interchangeable and/or mutually replaceable.

What is claimed is:

1. A linear displacement measuring device for determining an absolute position, comprising:
a) a linear rail which has a longitudinal axis and is composed of a plurality of individual rail segments, which rail segments are arranged next to each other in the direction of said longitudinal axis,
wherein each of the rail segments has a material measure which comprises at least one first incremental track extending in the direction of the longitudinal axis and having a plurality of equidistantly arranged position markings, and
wherein the material measure of one of the rail segments has an absolute track located next to the first incremental track of the material measure and having a plurality of position markings for coding a plurality of predetermined absolute positions which lie next to each other in the direction of the longitudinal axis;
b) a scanning device with a sensor arrangement for scanning the material measures, which sensor arrangement comprises at least a first sensor, a second sensor and a third sensor,
wherein the first sensor, the second sensor and the third sensor are arranged at intervals to each other and the scanning device is guided, with respect to the rail, to be movable in the direction of the longitudinal axis along a plurality of the rail segments,
thereby enabling the sensor arrangement to be arranged at each one of the rail segments so that the first sensor and the second sensor are enabled to scan the first incremental track of a respective rail segment in such a manner that the first sensor is configured to detect at least a first one of the position markings of the first incremental track of the respective rail segment and the second sensor is configured to detect at least a second one of the position markings of the first incremental track of the respective rail segment,
wherein the first sensor is configured to generate a first signal (S1) containing information about a position of the scanning device relative to the first one of the position markings detected by the first sensor, and wherein the second sensor is configured to generate a second signal (S2) containing information about a position of the scanning device relative to the second one of the position markings detected by the second sensor, wherein the first sensor and the second sensor are arranged offset relative to one another by a predetermined distance (D) in the direction of the longitudinal axis, so that the scanning device is enabled to be brought into a position (P1) with respect to in each case two adjacent rail segments, in which position the first sensor detects at least one of the position markings of the first incremental track of the material measure of the one of the two adjacent rail segments, and the second sensor detects at least one of the position markings of the first incremental track of the material measure of the other one of the two adjacent rail segments,
wherein the third sensor is configured to scan the absolute track of the material measure of the one of the rail segments and to generate a third signal (S3) containing information about a position of the scanning device relative to the predetermined absolute positions;
c) a first evaluation device for the third signal (S3), which is configured to detect whether the scanning device is located at one of the predetermined absolute positions regarding the one of the rail segments, and is configured, where an evaluation of the third signal (S3) shows that the scanning device is located at one of the predetermined absolute positions (P1) with respect to one of the rail segments at a first time, to determine a first absolute value (AW1) which represents the one of the predetermined absolute positions (P1);

d) a second evaluation device for the first signal (S1) and the second signal (S2), which is configured to evaluate, after the first time, the first signal and the second signal during a first time interval between the first time and a second time and to determine a position difference (PD) between the position (P1) of the scanning device at the beginning of the first time interval and a position (P2) of the scanning device at the second time at the end of the first time interval; and e) a computing unit comprising an output interface, wherein the computing unit is configured to calculate, from the first absolute value (AW1) and the position difference (PD) determined by the second evaluation device, a second absolute value (AW2) which represents an absolute position of the scanning device at the second time at the end of the first time interval, and wherein the computing unit is configured to output, via the output interface, the absolute position, wherein the material measure of at least one of the rail segments—with the exception of the one of the rail segments which has the absolute track—comprises a second incremental track which extends next to the first incremental track of the at least one of the rail segments in the direction of the longitudinal axis and has a plurality of equidistantly arranged position markings, wherein the second incremental track is arranged at the at least one of the rail segments so that the sensor arrangement of the scanning device is enabled to be arranged at the at least one of the rail segments in such a manner that the third sensor of the scanning device is enabled to scan the second incremental track, the third sensor thereby being enabled to detect position markings of the second incremental track, wherein the third sensor is configured to generate a fourth signal (S4) having a variation as a function of a position of the scanning device with respect to the position markings of the second incremental track detected by the third sensor, wherein the computing unit is configured to compare the fourth signal (S4) with one or more of the first signal (S1) or the second signal (S2), and wherein the first evaluation device and the second evaluation device comprise electronic components.

2. The linear displacement measuring device according to claim 1,
wherein the scanning device, the first evaluation device, the second evaluation device, or the computing unit are configured to be operated via a supply of electrical energy, and an electrical energy supply device (80) is present which is configured to enable an uninterrupted supply of electrical energy to one or more of the scanning device, the first evaluation device, the second evaluation device, or the computing unit after the first time.

3. The linear displacement measuring device according to claim 1,
wherein two adjacent position markings of the second incremental track are arranged at a distance (d2) from each other which is greater than the distance (d1) between two adjacent position markings of the first incremental track.

4. The linear displacement measuring device according to claim 1,
wherein the absolute track of the one of the rail segments comprises a first coding which contains information about at least one characteristic parameter of at least one of the other ones of the rail segments of the linear rail, and the first coding is detectable via the third sensor.

5. The linear displacement measuring device according to claim 4,
wherein the at least one characteristic parameter is a size of at least one of the other ones of the rail segments or a distance (d2) between two adjacent position markings of the second incremental track.

6. The linear displacement measuring device according to claim 1,
wherein the linear rail is composed of more than two of the rail segments, and
wherein all rail segments—with the exception of the one of the rail segments which has the absolute track—are formed to be identical.

7. The linear displacement measuring device according to claim 6,
wherein the rail segments are configured to be mounted in any order one behind the other to form the linear rail.

8. The linear displacement measuring device according to claim 6,
wherein each of the rail segments—with the exception of the one of the rail segments which has the absolute track—is interchangeable with an identical rail segment.

9. A linear guide comprising:
a movable body; and
a linear displacement measuring device according to claim 1,
wherein the movable body is supported on the linear rail of the linear displacement measuring device via rolling elements, so that the rolling elements enable a guided linear movement of the movable body in a longitudinal direction of the linear rail, and
wherein the scanning device of the linear displacement measuring device is arranged on the movable body.

10. The linear guide according to claim 9,
wherein two adjacent position markings of the second incremental track are arranged at a distance (d2) from each other which is greater than the distance (d1) between two adjacent position markings of the first incremental track.

11. The linear guide according to claim 9,
wherein the linear rail is composed of more than two of the rail segments,
wherein all rail segments—with the exception of the one of the rail segments which has the absolute track—are formed to be identical, and
wherein each of the rail segments—with the exception of the one of the rail segments which has the absolute track—is interchangeable with an identical rail segment.

12. The linear guide according to claim 9,
wherein the rail segments are configured to be mounted in any order one behind the other to form the linear rail, and
wherein each of the rail segments—with the exception of the one of the rail segments which has the absolute track—is interchangeable with an identical rail segment.

13. The linear displacement measuring device according to claim 1,
wherein the rail segments are configured to be mounted in any order one behind the other to form the linear rail, and wherein each of the rail segments—with the exception of the one of the rail segments which has the absolute track—is interchangeable with an identical rail segment.

14. A linear displacement measuring device for determining an absolute position, comprising:
a linear rail which has a longitudinal axis and is composed of a plurality of individual rail segments, which rail segments are arranged in the direction of said longitudinal axis, wherein each of the rail segments has a material measure which comprises:
 a first track extending in the direction of the longitudinal axis and having a plurality of equidistantly arranged position markings, wherein the first track comprises a first incremental track and
 a second track extending in the direction of the longitudinal axis and parallel to the first track, wherein the second track is one of
  an absolute track comprising a plurality of position markings for coding a plurality of predetermined absolute positions or
  a second incremental track, wherein the linear rail includes at least one absolute track; and
a scanning device comprising at least
 a first sensor configured to generate a first signal (S1) containing information about a position of the scanning device relative to the first portion of the first incremental track,
 a second sensor configured to generate a second signal (S2) containing information about a position of the scanning device relative to the second portion of the first incremental track, and
 a third sensor configured to scan the second track and generate:
  based on scanning the absolute track, a third signal (S3) containing information about a position of the scanning device relative to the predetermined absolute positions, and
  based on scanning the second incremental track, a fourth signal (S4) having a variation as a function of a position of the scanning device with respect to the position markings of the second incremental track detected by the third sensor,
 wherein the first sensor and the second sensor are spaced from each other along the longitudinal axis, wherein the first sensor is positioned to scan a first portion of the first incremental track, wherein the second sensor is positioned to scan a second portion of the first incremental track, wherein the third sensor is spaced from each of the first sensor and the second sensor and is positioned to scan portions of the second track, wherein the scanning device is configured to move relative to the linear rail in the direction of the longitudinal axis, wherein the first sensor and the second sensor are arranged offset relative to one another by a predetermined distance (D) in the direction of the longitudinal axis such that, in a case where the scanning device spans two adjacent rail segments, the first sensor is at a position (P1) where the first sensor detects first position markings of the first incremental track of a first of the two adjacent rail segments, and the second sensor detects second position markings of the first incremental track of a second of the two adjacent rail segments;
a first evaluation device, for the third signal (S3), configured to:
 detect whether the scanning device is located at a first of the predetermined absolute positions regarding the one of the rail segments, and
 determine, based on a detection that the scanning device is located at the first of the predetermined absolute positions at a first time, a first absolute value (AW1) which represents the one of the predetermined absolute positions (P1);
a second evaluation device, for the first signal (S1) and the second signal (S2), configured to:
 evaluate, after the first time, the first signal and the second signal during a first time interval between the first time and a second time, and
 determine a position difference (PD) between the position (P1) of the scanning device at the beginning of the first time interval and a position (P2) of the scanning device at the second time at the end of the first time interval; and
a computing unit comprising an output interface, wherein the computing unit is configured to calculate, based on the first absolute value (AW1) and the position difference (PD) determined by the second evaluation device, a second absolute value (AW2) which represents an absolute position of the scanning device at the second time at the end of the first time interval,
wherein the computing unit is configured to compare the fourth signal (S4) with one or more of the first signal (S1) or the second signal (S2).

* * * * *